United States Patent [19]

Chen

[11] Patent Number: 5,113,435
[45] Date of Patent: May 12, 1992

[54] STRUCTURE OF TELEPHONE KEYBOARD

[75] Inventor: Yung-Huei Chen, Kaohsiung,

[73] Assignee: Zeny Corporation, Kaohsiung, Taiwan

[21] Appl. No.: 448,631

[22] Filed: Dec. 11, 1989

[51] Int. Cl.⁵ .................. H04M 1/00; G09F 3/00
[52] U.S. Cl. .................................... 379/441; 40/336; 40/337; 40/338; 379/368; D14/151; D14/247
[58] Field of Search ............... 40/336, 337, 338, 339; 379/368, 437, 451, 441; D14/151, 247, 246

[56] References Cited

U.S. PATENT DOCUMENTS

| | | | |
|---|---|---|---|
| 2,624,965 | 1/1953 | Griswold | 40/336 |
| 4,026,033 | 5/1977 | Martin | 40/336 |
| 4,142,312 | 3/1979 | Stokes | 379/441 |
| 4,291,475 | 9/1981 | Schoener | 40/338 |
| 4,292,481 | 9/1981 | Barnes et al. | 379/441 |
| 4,866,764 | 9/1989 | Barker, III | 40/337 |

FOREIGN PATENT DOCUMENTS 2943458  5/1981  Fed. Rep. of Germany ...... 379/441
 836773 10/1937  France .................................. 40/331

OTHER PUBLICATIONS

"Photo Touch" by J.C. Penney ad, p. 12, Apr. 21–23, 1989.

*Primary Examiner*—Jin F. Ng
*Assistant Examiner*—Jason Chan
*Attorney, Agent, or Firm*—Fleit, Jacobson, Cohn, Price, Holman & Stern

[57] ABSTRACT

A telephone keyboard structure for making connections through static induction or touch induction control, which includes a key pad and a numbered transparent face plate with a thin slot defined therebetween for insertion therein of a picture, photo, or printed advertising card.

2 Claims, 3 Drawing Sheets

STRUCTURE OF TELEPHONE KEYBOARD

BACKGROUND OF THE INVENTION

The present invention is related to a keyboard structure for a telephone apparatus for making connections automatically through static induction or touch induction control, which can concomitantly used as a picture frame or billboard.

The telephone is an instrument for conveying speech over distances by converting sound into electric impulses sent through a wire. Conventional telephone apparatus may vary in design and function, however, they are commonly designed for the same purpose, i.e. for communication. It is an idea of the present invention to bestow a new life on an ordinary telephone apparatus so that a telephone apparatus can be simultaneously used as a picture frame of billboard while it works for communication over distances. Through the present invention, a landscape picture or a picture of one's family or beloved can be presented inside a numbered transparent face plate of the keyboard of a telephone apparatus. The picture presented in a telephone apparatus constructed according to the present invention can be conveniently replaced with another one when required. Instead of a picture, a memorandum may be visibly received in a telephone apparatus so that one can constantly see the note or important record to help the memory or for future use. For a public telephone, an advertising card or any card for public notice or announcement can be received therein to call people's attention.

The main object of the present invention is to provide a telephone apparatus which includes a keyboard for connecting lines through static induction or touch induction operation, having a thin slot between its key pad and numbered transparent face plate for insertion therein of a picture or printed card, etc.

Another object of the present invention is to provide a telephone apparatus which includes a keyboard having a curved notch at its one lateral side through which the picture or card which is inserted into the keyboard thereof can be conveniently pulled out for replacement with a finger.

SUMMARY OF THE INVENTION

The present invention is related to a telephone apparatus and more particularly to the one which includes a telephone keyboard for making connections through static induction or touch induction control. The telephone keyboard includes a key pad and a numbered transparent face plate, with a thin slot defined therebetween for insertion therein of a picture, photo, or printed advertising card.

DESCRIPTION OF THE PREFERRED EMBODIMENT

Figure 1:
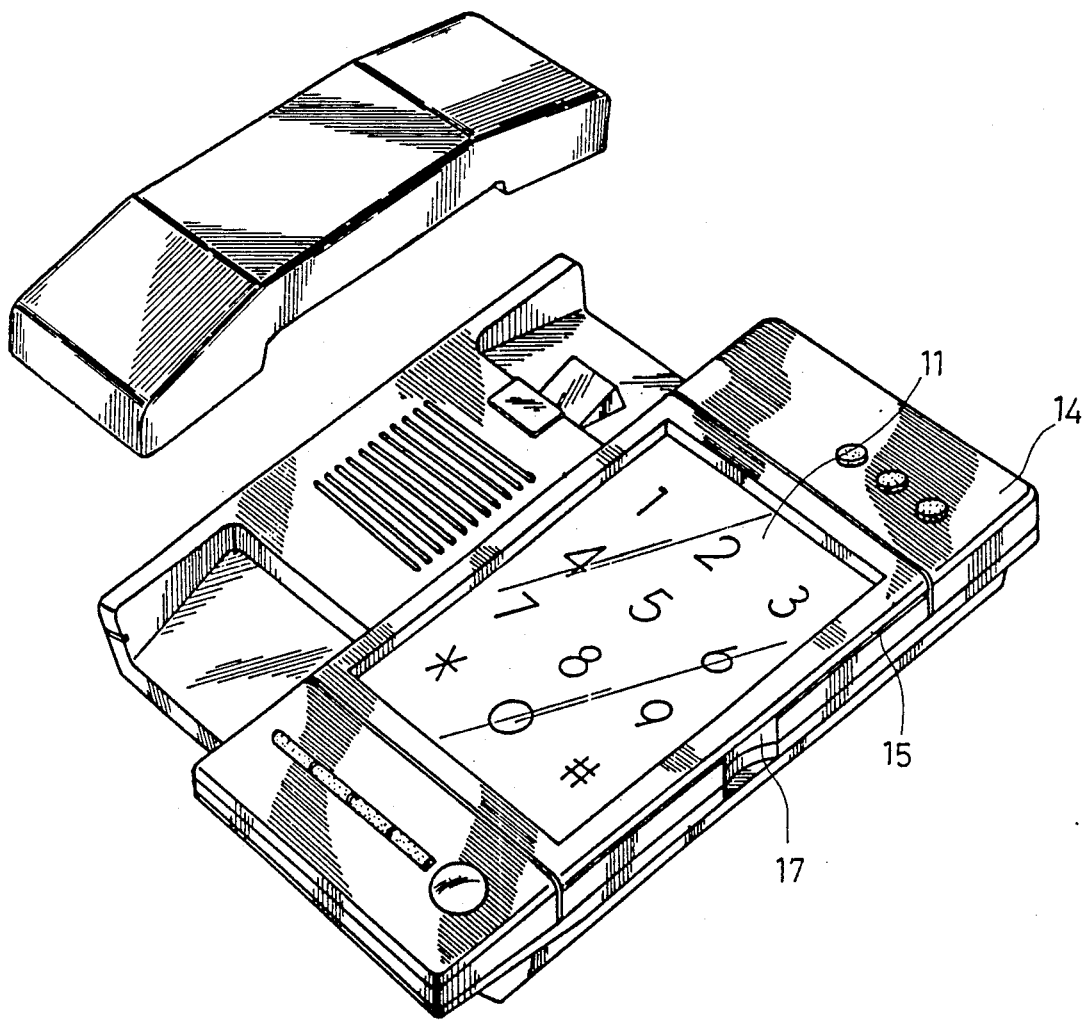
FIG. 1 is a perspective assembly view of the present invention.
Figure 2A:
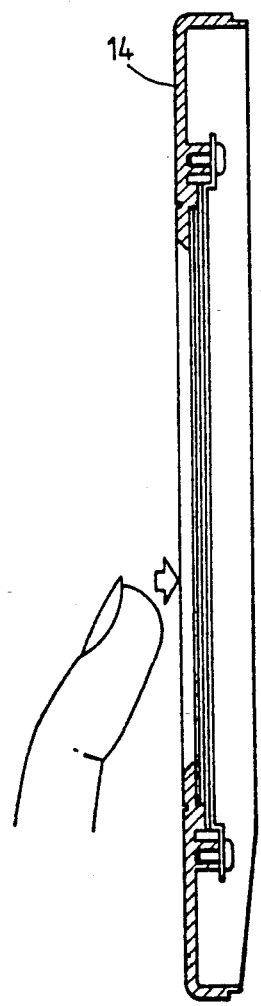
FIG. 2A is a cross-sectional structural view of the keyboard portion.
Figure 2B:
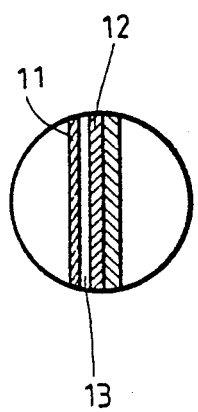
FIG. 2B is an elongated cross-sectional view of a portion of the keyboard.
Figure 3:
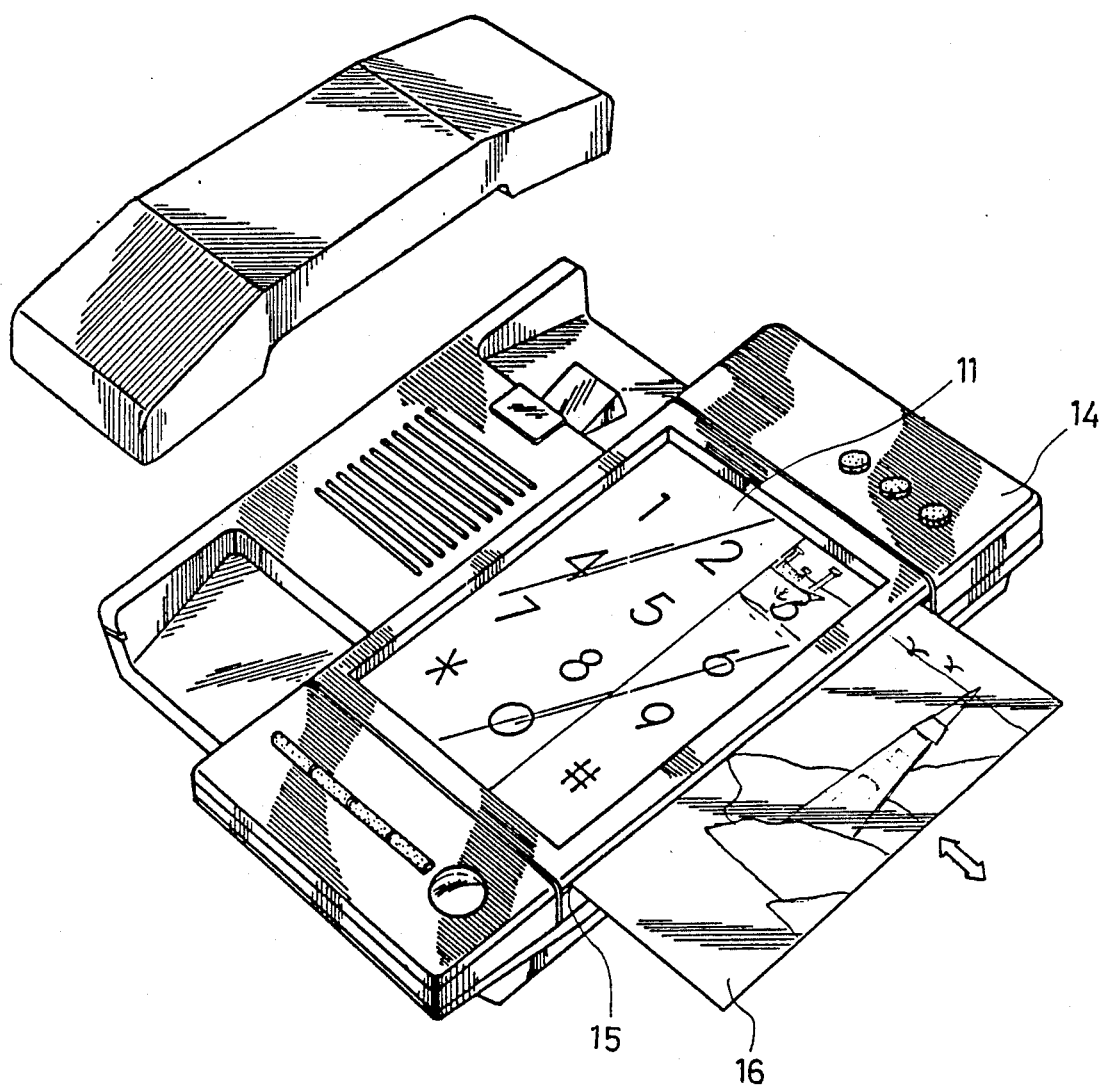
FIG. 3 illustrates the use of the present invention for insertion therein of a printed card.

Referring to FIGS. 1 and 2, a housing (14) of a telephone apparatus includes a telephone keyboard which is operated through static induction or touch induction, wherein the telephone keyboard includes a transparent face plate (11) having printed thereon key numerals and signs and being mounted on a key pad (12) which is used for making connections automatically. A thin slot (13) is maintained between the transparent face plate (11) and the KEY PAD (12). An elongated opening (15) is made on the housing (14) of the telephone apparatus at one side thereof and communicating with the thin slot (13). Through the elongated opening (15), a card (16) which is printed with patterns or letters is inserted into the thin slot (13) between the transparent face plate (11) and the key pad (12) (see FIG. 3). After a card (16) is inserted into the thin slot (13), the patterns or letters thereon can be clearly seen through the transparent face plate (11). Thus, the keyboard structure of the present invention can be used as a picture frame, a note holder or a billboard. Further, a curved notch (17) is made on the housing (14) below the elongated opening (15), through which the card (16) inserted into the thin slot (13) can be conveniently pulled out with a finger. The structure of the present invention can be used in any telephone apparatus in which connections are made through a static induction or touch induction keyboard. Because the thickness of the thin slot (13) is just for receiving a card, it does not affect the function of the keyboard in making connections.

What I claim is:

1. A telephone apparatus, including a housing having thereon a keyboard, said keyboard comprising a key pad, which is used for making connections automatically through at least one control selected from the group consisting of static induction or touch induction control, and a transparent face plate, which has printed key numerals and signs thereon and is mounted on said key pad, defining therebetween a thin slot, said housing comprising an elongated opening at its one lateral side communicating with said thin slot, and through which a card which is printed with patterns or letters can be inserted into said thin slot.

2. The telephone apparatus as claimed in claim 1, wherein a curved notch is made on said housing below said elongated opening, through which the card inserted into said thin slot can be conveniently pulled out with a finger.

* * * * *